(12) United States Patent
Kramer

(10) Patent No.: US 10,426,264 B2
(45) Date of Patent: *Oct. 1, 2019

(54) PORTABLE ORGANIZER SYSTEM

(71) Applicant: Teri Kramer, Fort Worth, TX (US)

(72) Inventor: Teri Kramer, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,529

(22) Filed: Jan. 31, 2018

(65) Prior Publication Data

US 2019/0029417 A1  Jan. 31, 2019

Related U.S. Application Data

(63) Continuation of application No. 15/187,759, filed on Jun. 20, 2016, now Pat. No. 9,894,989, which is a
(Continued)

(51) Int. Cl.
| | |
|---|---|
| *A47F 5/00* | (2006.01) |
| *A47F 5/04* | (2006.01) |
| *A47B 57/16* | (2006.01) |
| *A47B 57/40* | (2006.01) |
| *A47B 63/00* | (2006.01) |

(Continued)

(52) U.S. Cl.
CPC ............. *A47B 81/00* (2013.01); *A47B 57/16* (2013.01); *A47B 57/40* (2013.01); *A47B 57/42* (2013.01); *A47B 63/00* (2013.01); *A47B 95/02* (2013.01); *A47F 5/0025* (2013.01); *A47F 5/0037* (2013.01); *A47F 7/147* (2013.01); *F16M 3/00* (2013.01); *F16M 11/42* (2013.01); *A47B 2063/005* (2013.01); *A47B 2095/021* (2013.01); *A47F 7/146* (2013.01)

(58) Field of Classification Search
CPC .......... F16M 3/00; A47B 57/16; A47B 57/40; A47B 63/00; A47F 5/0025; A47F 7/146
USPC ............. 211/10, 11, 70.6, 88.01, 94.01, 103, 211/126.1, 126.13, 126.2, 126.5, 131.1, 211/133.1, 133.3, 163, 175, 186, 187, 211/207, 208; 248/127, 1, 28, 129, 248/145.6, 220.21, 220.31, 220.41, 248/220.42; 280/35, 79.11, 638; 206/315.11
See application file for complete search history.

(56) References Cited

U.S. PATENT DOCUMENTS

| 109,602 A | 11/1870 | Evans |
|---|---|---|
| 274,087 A | 3/1883 | Danner |
(Continued)

FOREIGN PATENT DOCUMENTS

| CH | 346430 A | 5/1960 |
|---|---|---|
| DE | 2019457 A1 | 11/1971 |
(Continued)

OTHER PUBLICATIONS

Global Industries, "Double-Sided Mobile Rack with Bins," Model T9L550170YL, www.globalindustries.com, published prior to Feb. 7, 2014.

(Continued)

*Primary Examiner* — Joshua E Rodden
(74) *Attorney, Agent, or Firm* — Bill R. Naifeh

(57) ABSTRACT

A portable organizer system, including a base, a column coupled to the base, a plurality of receivers coupled to the column, wherein each receiver in the plurality of receivers includes a back element adapted to couple to the column and having a lower edge, and an angled planar element sharing the lower edge of the back element.

20 Claims, 12 Drawing Sheets

Related U.S. Application Data continuation of application No. 14/290,989, filed on May 30, 2014, now Pat. No. 9,371,952, which is a continuation of application No. 13/197,405, filed on Aug. 3, 2011, now Pat. No. 8,777,024.

(51) Int. Cl.

| | |
|---|---|
| *A47F 7/14* | (2006.01) |
| *F16M 3/00* | (2006.01) |
| *A47B 81/00* | (2006.01) |
| *F16M 11/42* | (2006.01) |
| *A47B 57/42* | (2006.01) |
| *A47B 95/02* | (2006.01) |

(56) References Cited

U.S. PATENT DOCUMENTS

| | | |
|---|---|---|
| 727,107 A | 5/1903 | Donaldson |
| 770,903 A | 9/1904 | Holt |
| 844,754 A | 2/1907 | Sardou et al. |
| 929,897 A | 8/1909 | Taylor |
| 1,065,381 A | 6/1913 | Martin |
| 1,554,137 A | 9/1925 | Slifkin |
| 1,570,651 A | 1/1926 | Topping et al. |
| 1,889,829 A | 12/1932 | Govier et al. |
| 1,900,610 A | 3/1933 | Mullins |
| 2,289,212 A | 7/1942 | Rinnela |
| 2,316,892 A | 4/1943 | Saul, Jr. |
| 2,579,704 A | 12/1951 | Saul, Jr. |
| 2,760,647 A | 8/1956 | Saul, Jr. |
| 2,953,257 A | 9/1960 | McNeill |
| 3,015,466 A | 1/1962 | Levy |
| 3,081,718 A | 3/1963 | Shoffner |
| 3,126,844 A | 3/1964 | Burne et al. |
| 3,132,609 A | 5/1964 | Chesley |
| 3,135,389 A | 6/1964 | Farley |
| 3,243,047 A | 3/1966 | Witteborg |
| 3,343,685 A | 9/1967 | Giambalvo |
| 3,414,133 A | 12/1968 | Guerri et al. |
| 3,428,187 A | 2/1969 | Baggott |
| 3,517,623 A | 6/1970 | Goldstein et al. |
| 3,543,943 A | 12/1970 | Joy et al. |
| 3,791,528 A | 2/1974 | Brendgord |
| 3,908,831 A | 9/1975 | Brendgord |
| 4,037,851 A | 7/1977 | Romero |
| D250,301 S | 11/1978 | Handler et al. |
| 4,126,366 A | 11/1978 | Handler et al. |
| 4,140,223 A | 2/1979 | Rau et al. |
| 4,197,950 A | 4/1980 | Ovitz, III |
| 4,240,684 A | 12/1980 | Henning |
| 4,312,086 A | 1/1982 | Bianco |
| 4,345,526 A | 8/1982 | Streit |
| 4,444,323 A | 4/1984 | Travis |
| 4,480,755 A | 11/1984 | Cartwright |
| 4,531,645 A | 7/1985 | Tisbo et al. |
| 4,537,316 A | 8/1985 | Simon et al. |
| D288,147 S | 2/1987 | Helinsky |
| 4,678,089 A | 7/1987 | Lang |
| 4,736,856 A | 4/1988 | Alneng et al. |
| 4,889,377 A | 12/1989 | Hughes |
| 4,898,281 A | 2/1990 | Cherry |
| 4,919,282 A | 4/1990 | Duff et al. |
| 5,022,537 A | 6/1991 | Henriquez |
| 5,035,321 A | 7/1991 | Denton |
| 5,101,997 A | 4/1992 | Bagwell et al. |
| 5,205,638 A | 4/1993 | Squitieri |
| 5,240,264 A | 8/1993 | Williams |
| 5,337,904 A | 8/1994 | Goldberg |
| 5,464,104 A | 11/1995 | McArthur |
| 5,482,342 A | 1/1996 | Kowalski et al. |
| 5,531,168 A | 7/1996 | Towfigh |
| 5,595,395 A | 1/1997 | Wilson |
| D379,886 S | 6/1997 | Towfigh |
| 5,653,348 A | 8/1997 | MacDonald |
| 5,772,050 A | 6/1998 | Shih |
| 5,813,528 A | 9/1998 | Bliek et al. |
| 5,899,423 A | 5/1999 | Albertini |
| 5,921,414 A | 7/1999 | Burke et al. |
| 5,934,636 A | 8/1999 | Cyrell |
| 6,302,280 B1 | 10/2001 | Bermes |
| 6,477,966 B1 | 11/2002 | Petryna |
| 6,561,365 B2 | 5/2003 | Bustos |
| D477,726 S | 7/2003 | Day |
| 6,502,707 B1 | 7/2003 | Sullivan |
| 6,591,996 B1 | 7/2003 | Wu |
| 6,805,246 B1 | 10/2004 | Manabat |
| 6,837,386 B1 | 1/2005 | Kent et al. |
| 7,213,951 B2 | 5/2007 | Cowan |
| D582,699 S | 12/2008 | Nelson |
| 7,540,510 B2 | 6/2009 | Sparkowski |
| 7,815,202 B2 | 10/2010 | Richards et al. |
| 7,891,633 B2 | 2/2011 | Li |
| 8,051,994 B2 | 11/2011 | Jin et al. |
| 8,225,946 B2 | 7/2012 | Yang |
| 8,276,524 B2 | 10/2012 | Goode et al. |
| 8,763,821 B2 | 7/2014 | Yang |
| 8,770,553 B2 | 7/2014 | Van Es |
| 8,777,024 B2 | 7/2014 | Kramer |
| 8,985,351 B1 | 3/2015 | Longo et al. |
| 9,371,952 B2 | 6/2016 | Kramer |
| 9,894,989 B2 | 2/2018 | Kramer |
| 2005/0073119 A1 | 4/2005 | Kirakosyan |
| 2005/0183638 A1 | 8/2005 | Lin |
| 2006/0250057 A1 | 11/2006 | Vasudeva |
| 2007/0086840 A1 | 4/2007 | Emrani et al. |
| 2008/0142463 A1 | 6/2008 | Johnson |
| 2008/0143069 A1 | 6/2008 | Richards et al. |
| 2008/0156749 A1 | 7/2008 | Shea |
| 2009/0127413 A1 | 5/2009 | Herron, III et al. |
| 2011/0073553 A1 | 3/2011 | Buege |

FOREIGN PATENT DOCUMENTS

| | | |
|---|---|---|
| DE | 2428976 A1 | 1/1976 |
| FR | 938318 | 9/1948 |
| FR | 57443 | 1/1953 |
| FR | 1200552 A | 12/1959 |
| FR | 2641586 A1 | 7/1990 |
| GB | 450838 A | 7/1936 |
| GB | 2138751 A | 10/1984 |
| GB | 2201339 A | 9/1988 |
| JP | 6143159 A | 5/1994 |
| JP | 2001-218631 A | 8/2001 |

OTHER PUBLICATIONS

Global Industries, "Double-Sided Mobile Rack with Bins," www.globalindustries.com, published prior to Feb. 7, 2014.

Global Industries, "Stack and Lock Bins," www.globalindustries.com, published prior to Feb. 7, 2014.

International Search Report and Written Opinion, dated Sep. 20, 2012, by the ISA/US, re PCT/US2012/047575.

Notice of Allowance, dated Mar. 5, 2014, by the USPTO, re U.S. Appl. No. 13/197,405.

Examiner Interview Summary, dated Dec. 23, 2013, by the USPTO, re U.S. Appl. No. 13/197,405.

Office Action, dated Oct. 28, 2013, by the USPTO, re U.S. Appl. No. 13/197,405.

Final Office Action dated Jul. 5, 2013, by the USPTO, re U.S. Appl. No. 13/197,405.

Examiner Interview Summary, dated Jun. 5, 2013, by the USPTO, re U.S. Appl. No. 13/197,405.

Office Action, dated Mar. 5, 2013, by the USPTO, re U.S. Appl. No. 13/197,405.

Restriction Requirement dated Jan. 17, 2013, by the USPTO, re U.S. Appl. No. 13/197,405.

Notice of Allowance, dated Feb. 19, 2016, by the USPTO, re U.S. Appl. No. 14/290,989.

Office Action, dated Oct. 26, 2015, by the USPTO, re U.S. Appl. No. 14/290,989.

(56) References Cited

OTHER PUBLICATIONS

Final Office Action, dated Feb. 8, 2017, by the USPTO, re U.S. Appl. No. 14/617,638.
Office Action, dated Jul. 29, 2016, by the USPTO, re U.S. Appl. No. 14/617,638.
Restriction Requirement, dated Feb. 23, 2016, by the USPTO, re U.S. Appl. No. 14/617,638.
Notice of Allowance, dated Jun. 26, 2017, by the USPTO, re U.S. Appl. No. 15/187,759.
Office Action, dated Dec. 9, 2016, by the USPTO, re U.S. Appl. No. 15/187,759.
Final Office Action, dated Mar. 15, 2019, by the USPTO, re U.S. Appl. No. 15/617,660.
Notice of Allowance, dated Apr. 25, 2019, by the USPTO, re U.S. Appl. No. 15/617,660.
Office Action, dated Oct. 4, 2018, by the USPTO, re U.S. Appl. No. 15/617,660.

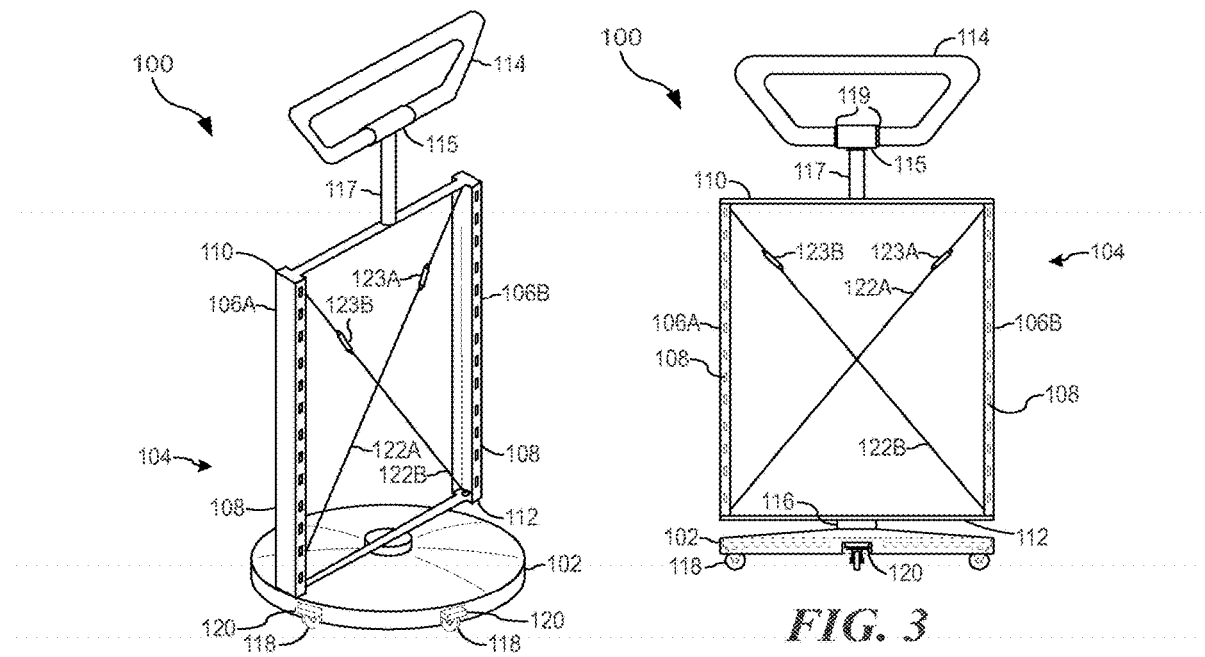
FIG. 2
FIG. 3
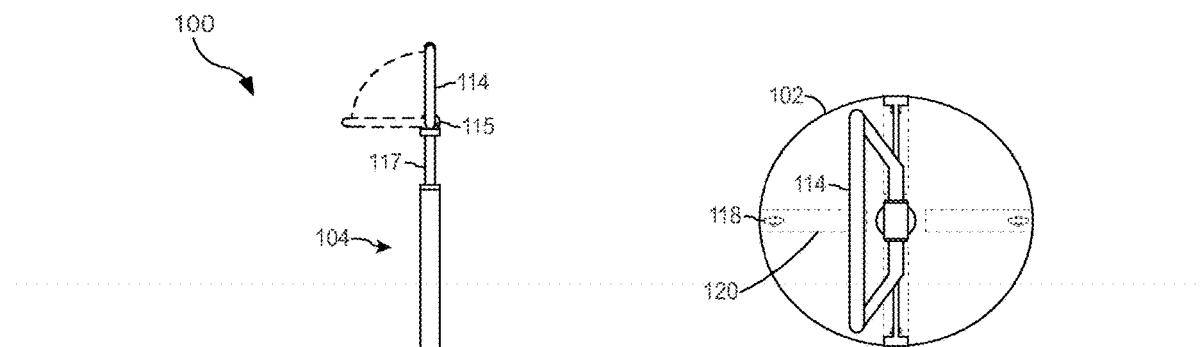
FIG. 4
FIG. 5

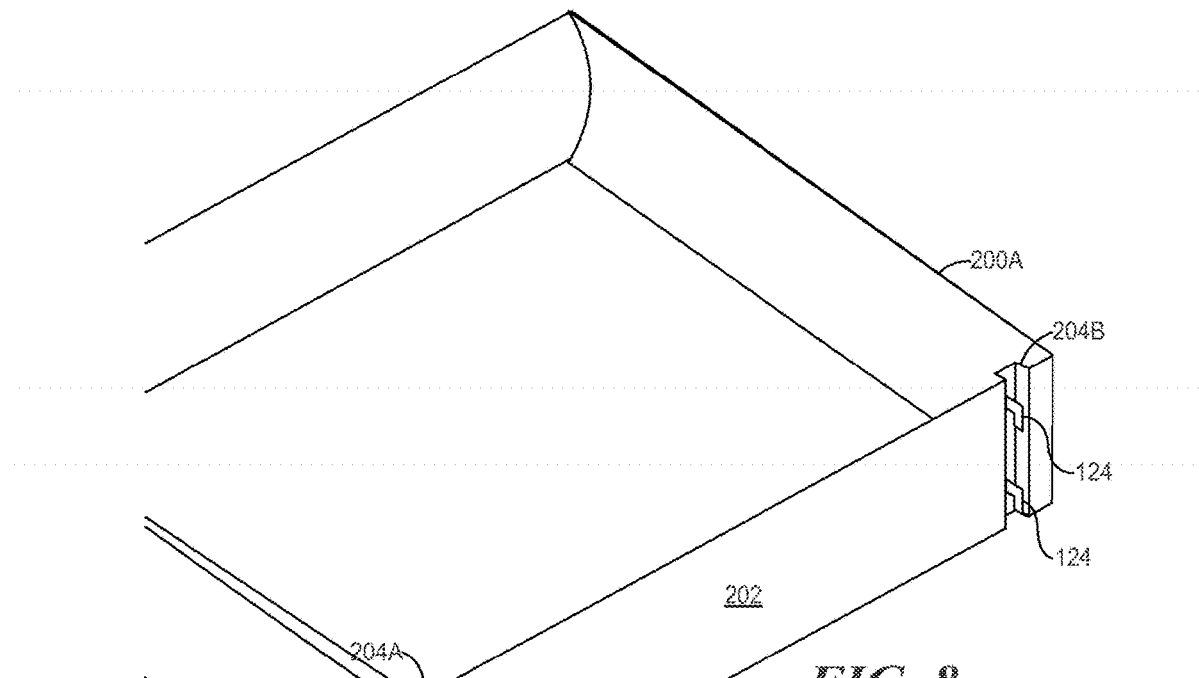
FIG. 8
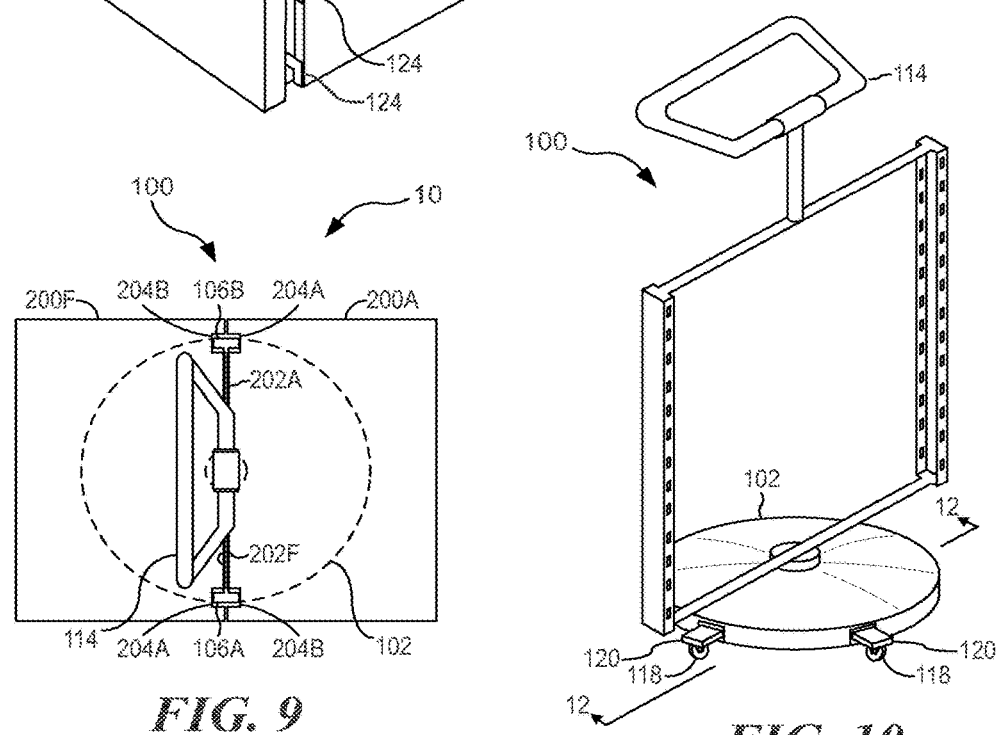
FIG. 9
FIG. 10

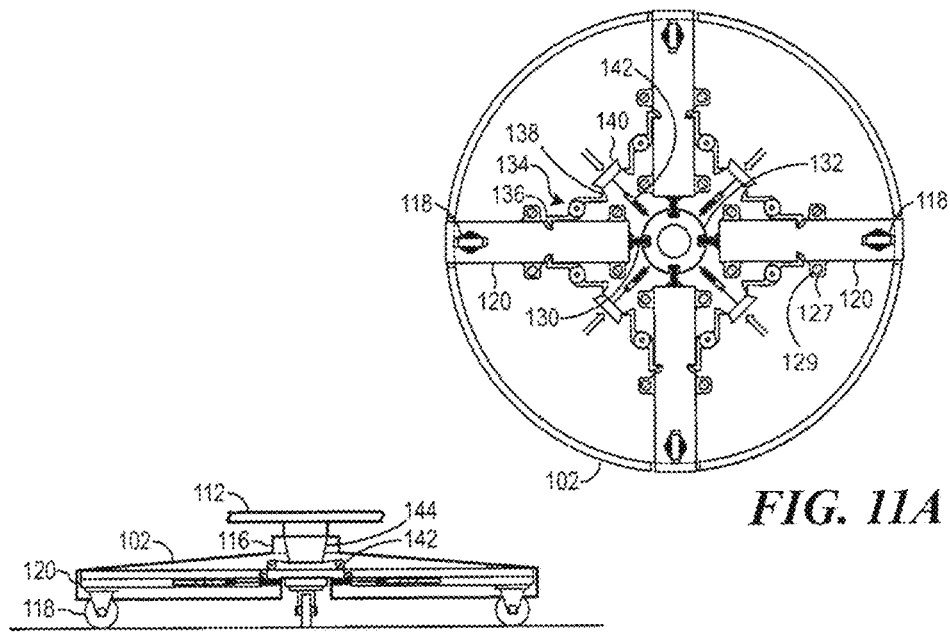
FIG. 12A
FIG. 11A
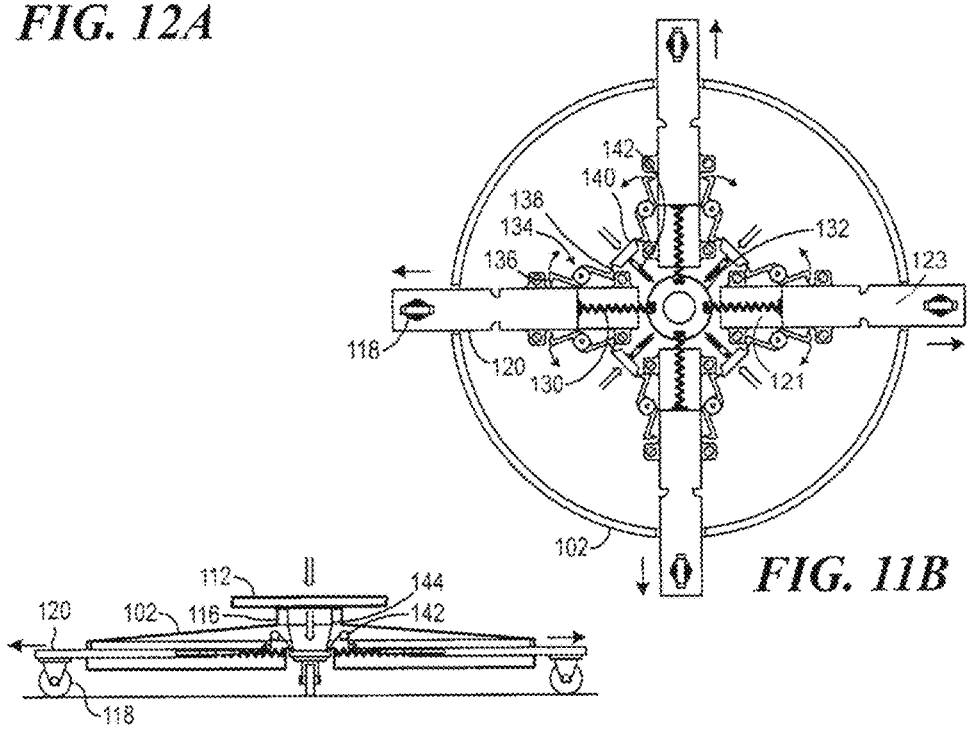
FIG. 12B
FIG. 11B

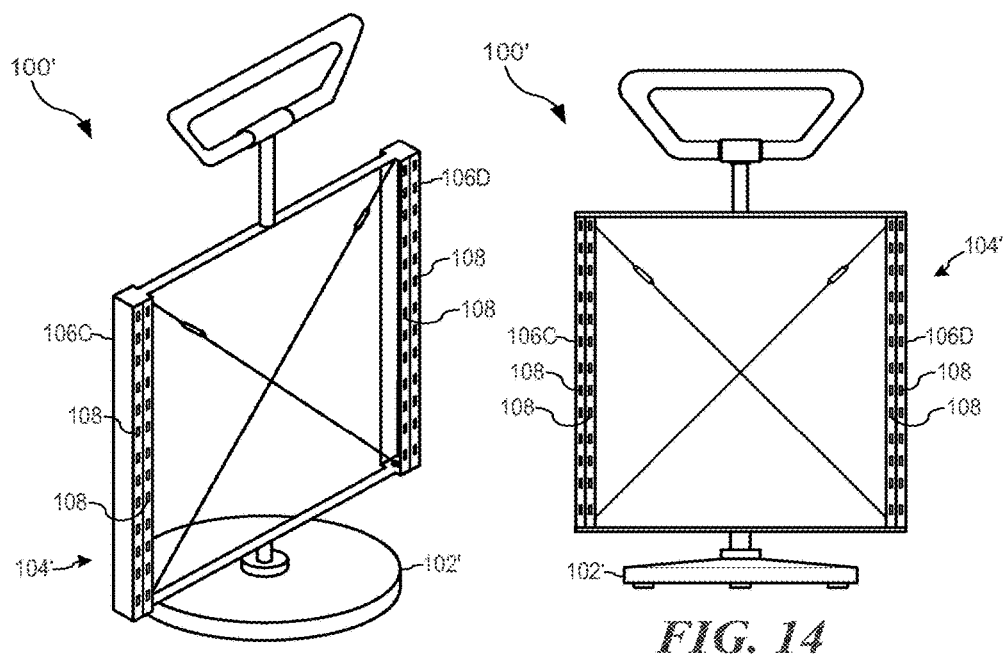
*FIG. 13*
*FIG. 14*
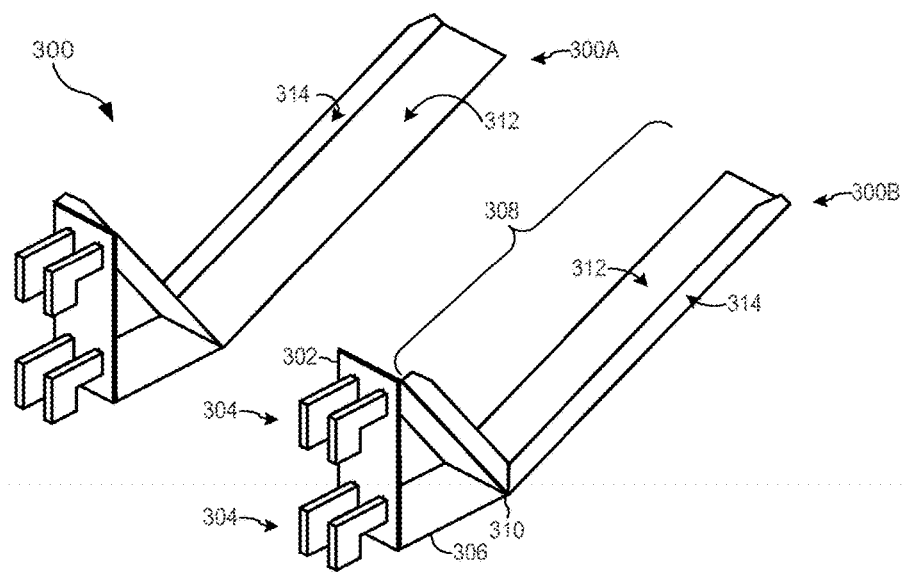
*FIG. 15*

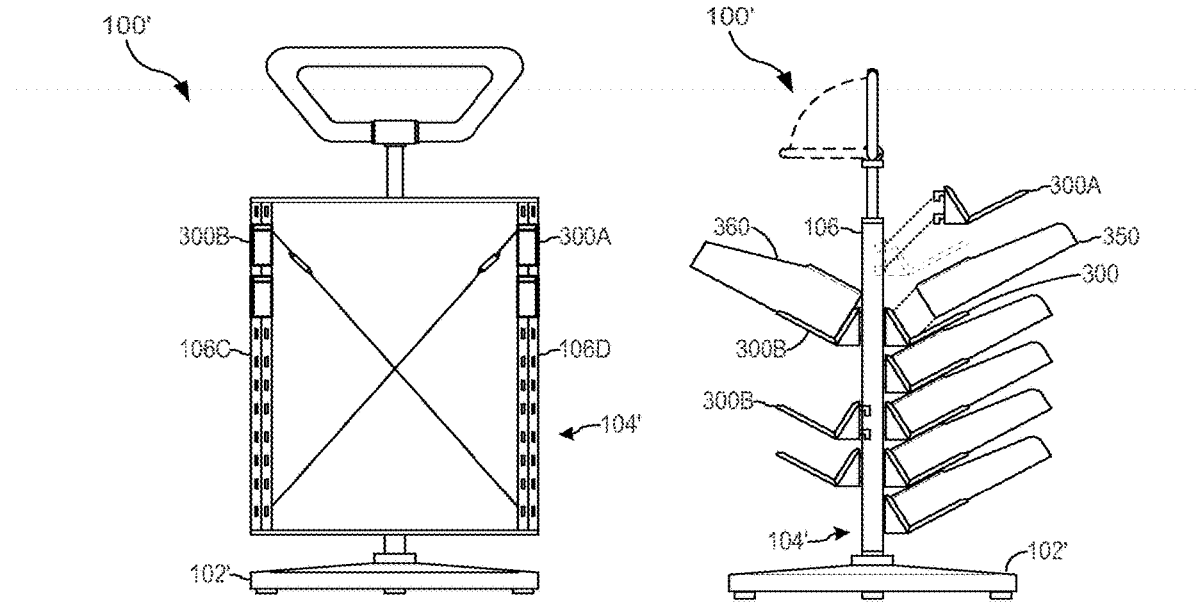
*FIG. 16*   *FIG. 17*
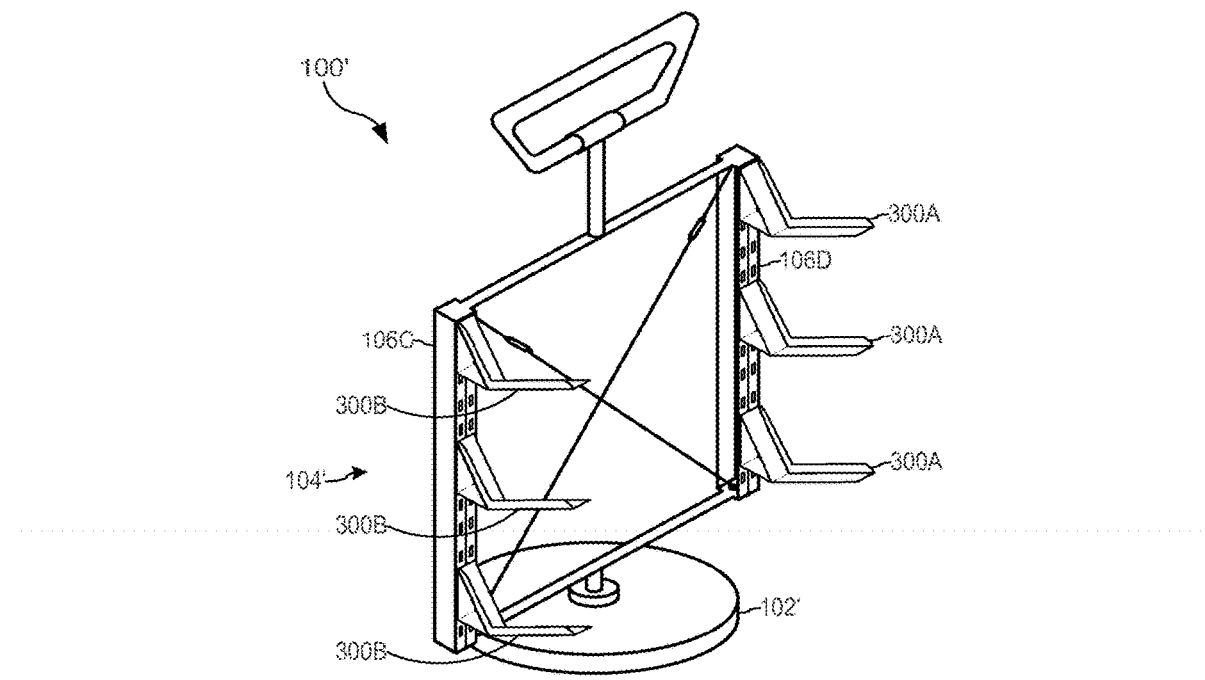
*FIG. 18*

PORTABLE ORGANIZER SYSTEM

CROSS REFERENCE TO RELATED APPLICATIONS:

This application is a continuation of U.S. patent application Ser. No. 15/187,759 filed Jun. 20, 2016, entitled PORTABLE ORGANIZER SYSTEM, which is a continuation of U.S. patent application Ser. No. 14/290,989 filed May 30, 2014, entitled PORTABLE ORGANIZER SYSTEM, which is a continuation of U.S. patent application Ser. No. 13/197,405, filed on Aug. 3, 2011, entitled PORTABLE ORGANIZER; the disclosures of which are incorporated herein by reference for all purposes.

TECHNICAL FIELD

The present invention relates to a storage unit and, more particularly, to a storage unit comprising an array of receivers such as bins and a stand removably supporting the array of bin.

BACKGROUND INFORMATION

Many people have multiple projects "in process" at the same time with associated stacks for each project. Filing these stacks in a filing cabinet tends to put them out of mind. Additionally, most people desire the convenience of easy and ready access to in-process project stacks. Consequently, they keep the stacks for their in-process projects on the desktop in loose stacks, or in open-top stackable boxes like "in baskets", or nearby in transportable carrying cases (oftentimes having handles). When a project is completed, many people file the associated stack in a filing cabinet, or throw all or part of it away.

Many people in home offices and workers in business offices have a limited amount of desk space and/or occasionally desire that their in-process project stacks be transportable so they can quickly and easily move their workspace to another area, and/or clear the look of clutter by moving their work out of sight, into a closet or other inconspicuous area.

The approaches bulleted above for handling in-process stacks conflict with limitations and desires:

Loose stacks occupy often all-too-limited desk space, tend to look cluttered, and are not easily transported.

Stackable boxes like "in-baskets" occupy limited desk space and are not easily transported.

Although carrying cases tend to be easily transportable, such cases when closed fail to provide easy and ready access to their contents or can occupy space and add to the impression of clutter when the top is left open.

A need therefore exists for a free-standing, transportable storage unit that also provides easy and ready access to papers (and other supplies for various arts and crafts) that may be contained therein.

SUMMARY

A portable organizer system, comprising a base, a column coupled to the base, a plurality of receivers coupled to the column, wherein each receiver in the plurality of receivers includes a back element adapted to couple to the column and having a lower edge, and an angled planar element sharing the lower edge of the back element. Other alternative embodiments and optional features are described within. However, the claims define the scope of the invention(s) described.

These and other features, and advantages, will be more clearly understood from the following detailed description taken in conjunction with the accompanying drawings. It is important to note the drawings are not intended to represent the only aspect of the invention.

BRIEF DESCRIPTION OF THE DRAWINGS

For a more complete understanding of the present invention and the advantages thereof, reference is now made to the following Detailed Description taken in conjunction with the accompanying drawings, in which:

FIG. 2 is a perspective view of the embodiment of a stand shown in FIG. 1;

FIG. 3 is a front view of the embodiment of a stand shown in FIG. 1;

FIG. 4 is a side view of the embodiment of a stand shown in FIG. 1;

FIG. 5 is a top view of the embodiment of a stand shown in FIG. 1;

FIG. 8 is a close-up perspective view of the rear portion of an example of one bin of the embodiment of an array of removable bins;

FIG. 9 is a top view of the embodiment of a stand shown in FIG. 1 supporting the embodiment of an array of removable bins;

FIG. 10 is a perspective view of the embodiment of a stand shown in FIG. 1 showing a handle in a folded-down position;

FIG. 11A and FIG. 11B are views of an underside of the embodiment of an organizer shown in FIG. 1;

FIG. 12A and FIG. 12B are cross-sectional views of the embodiment of an organizer shown in FIG. 1;

FIG. 13 is a perspective view of an alternate embodiment of the stand;

FIG. 14 is a front view of the alternate embodiment of the stand shown in FIG. 13;

FIG. 15 is a perspective view of a pair of angled mounting brackets for use with the stand shown in FIGS. 13-14;

FIG. 16 is a front view of the stand shown in FIGS. 13-14 with pairs of angled mounting brackets mounted thereon;

FIG. 17 is a side view of the stand shown in FIGS. 13-14 with pairs of angled mounting brackets supporting additional containers;

FIG. 18 is a perspective view of the stand shown in FIGS. 13-14 with pairs of angled mounting brackets mounted thereon;

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in simplified form in order not to obscure the present invention in unnecessary detail.

Figure 1:
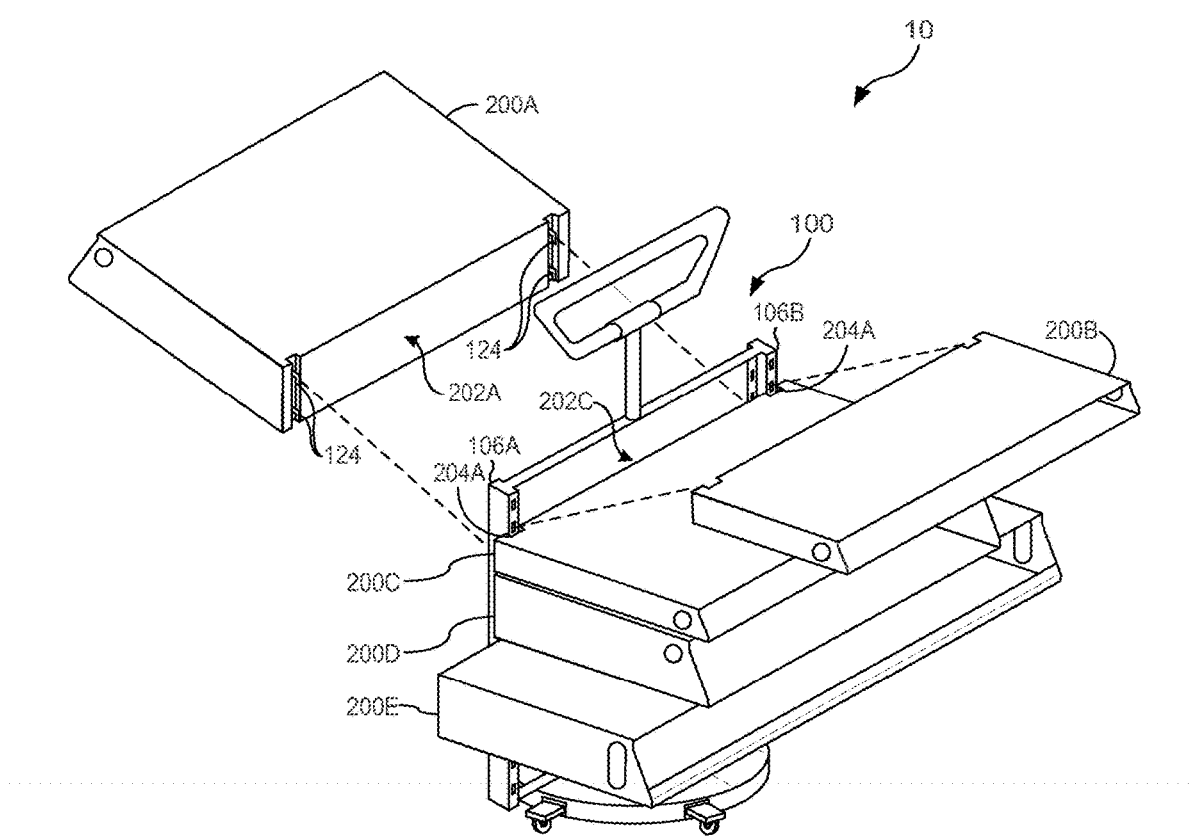
FIG. 1 is a perspective view of an embodiment of a stand supporting the embodiment of an array of removable bins.

Turning now to FIG. 1, an array of bins 10 comprises a stand 100 configured for holding one or more removable bins 200. In an embodiment, the stand 100 comprises one or more vertical supports 106 configured for coupling with the bins 200 (and brackets 300 shown in FIG. 15) in a manner to be described hereinafter.

Turning now to FIGS. 2-5, an embodiment of the stand 100 comprises a frame 104 supported by a base 102, and having a handle 114 coupled to the top of frame 104. The frame 104 comprises a first vertical support member 106A and a second vertical support member 106B, each vertical support 106 A, B being an elongated member having a number of slots 108 formed therein for supporting one or more removable bins 200. While much of the description is in the context of bins 200, other receivers or holders such as shelves and trays may also be employed. The term receivers as used here is intended to be generic to trays, shelves and bins.

The slots 108 may be a single column of rectangular apertures formed in surfaces of each of vertical support members 106A and 106B, and may be spaced apart vertically at regular intervals. Alternatively, as is shown in FIGS. 13 and 14, a double-column of slots 108 may be provided in the surfaces of vertical support members 106C and 106D, wherein the slots 108 may be configured as side-by-side pairs of slots arranged one above the other. The horizontal spacing of side-by-side pairs of slots 108 preferably conforms to spacing of corresponding, double-hook mounting features of bins 200 or other mounting brackets 300, shown in FIG. 15. The vertical spacing of slots 108 preferably conforms to the vertical spacing of corresponding mounting hooks 124 of bins 200 A-E. Although hooks 124 and slots 108 are used as connector mechanisms to secure and remove the bins 200 A-E to and from the stand 100, it will be appreciated that other releasable fastening connectors may be used in the alternative, such as posts, Velcro strips, releasable clamps, and the like.

The frame 104 further comprises an upper horizontal support member 110 and a lower horizontal support member 112. The lower horizontal support member 112 may be coupled at one end thereof to a lower end of first vertical support member 106A, and may be coupled at an opposite end thereof to a lower end of second vertical support member 106B. The upper horizontal support member 110 may be coupled at one end thereof to an upper end of first vertical support member 106A, and may be coupled at an opposite end thereof to an upper end of second vertical support member 106B. The support members 106A, 106B, 110, and 112 may be secured together by any suitable means such as, for example, by welding or brazing the support members together where their surfaces meet, or by mechanical fasteners such as, for example, with rivets, screws, bolts, nuts and the like. The support members 106A, 106B, 110, and 112 form the generally rectangular frame 104 for supporting removable bins 200.

The frame 104 may further comprise structurally reinforcing tension wires 122A and 122B for maintaining an orthogonal relationship between adjacent support members 106A, 106B, 110, and 112. In an embodiment, tension wire 122A may be secured to the frame 104 at its upper left-hand corner and at its lower right-hand corner, while tension wire 122B may be secured to the frame 104 at its upper right-hand corner and at its lower left-hand corner. Tension wires 122A and 122B may be secured to the frame 104 by any suitable mechanical fastening means such as, for example, by looping each end of the wire through an "eye" bolt secured to one of the support members 106A, 106B, 110, and 112 and clamped with a suitable wire clamp. In an embodiment, each tension wire 122A and 122B may incorporate a turnbuckle 123A or 123B for adjusting the tension on the wire in a well-known manner. Alternatively, the frame 104 may be provided with stiffening brackets in its corners to reinforce the frame against collapsing. As another alternative, the frame 104 may incorporate a flat, rectangular plate extending to and secured between support members 106A, 106B, 110 and 112 to maintain the rectangular configuration of the frame 104.

In an embodiment, the handle 114 may be coupled to frame 104 at the upper horizontal support member 110. The handle 114 may be provided with a pivotable coupling 115 having a vertical extension 117. The vertical extension 117 may be securely affixed to the upper horizontal support member 110 by any suitable means such as, for example, by welding or brazing the vertical extension 117 to the upper horizontal support member 110 where their surfaces meet, or by mechanical fasteners such as, for example, with rivets, screws, or bolts and nuts. The pivotable coupling 115 may be formed integrally with the vertical extension 117, or the pivotable coupling 115 may be formed separately and securely affixed to the vertical extension 117 by any suitable means such as, for example, by welding or brazing, by use of mechanical fasteners and the like. The handle 114 may be coupled to the pivotable coupling 115 by any suitable means that provides for the handle 114 pivoting between an upright, or vertical position and a horizontal position, as shown in FIG. 4, for example. In an embodiment, the pivotable coupling 115 may comprise internal friction members 119 (FIG. 3) engaging the handle 114 such that the handle 114 remains in a given orientation, whether it be vertical, horizontal, or in an intermediate position, until the handle 114 is moved by hand. In other embodiments, the pivotable coupling 115 may comprise internal stops for retaining the handle 114 in at least a vertical position or a horizontal position. When placed in a horizontal position, the handle may be used to temporarily support the contents of one or more of the bins 200.

The base 102 of the stand 100 is preferably not wider than a "standard-sized" bin 200 to conserve space. The base 102 can be made of any material of sufficient strength to support the assembly on an underlying surface, and may be configured as a solid article as shown, for example, in FIG. 13, or may be configured as a collapsible tripod with folding legs or other configuration that will support the assembly. The stand 100 may, in some embodiments, further incorporate a swivel 116 between the base 102 and the frame 104 to be able to rotate the frame 104 with respect to the base 102. The frame 104 may be coupled to the base 102 at swivel 116 by any suitable means such as, for example, by welding or brazing the frame 104 to the swivel 116 where their surfaces meet, or by mechanical fasteners such as, for example, rivets, screws, bolts and nuts and the like. Otherwise, the frame 104 may be statically coupled to the base by any suitable mechanical means.

The base 102 may, in some embodiments, further include wheels 118 coupled to the base 102, under and within the perimeter of the base 102. The wheels 118 may be casters mounted to extendable and retractable slide mechanisms 120 operable to extend the casters beyond the supporting perimeter of the hollow base and also operable to retract the casters under and within the perimeter of the base 102. The retractable slide mechanisms 120 may be secured to the base 102 by mechanical fasteners such as, for example, machine screws. Alternatively, the retractable slide mechanisms 120 may be inserted into receptacles formed in the underside of the base 120 and secured to the base 120 by resilient clips. The casters are shown fully extended in FIG. 1, are shown partially extended in FIG. 2, and are shown fully retracted in FIGS. 3-5.

The spacing between the two vertical supports 106A, 106B can be selected depending upon the application of the array of bins 10 and the size of the bins 200. Generally, the spacing between the vertical supports 106A, 106B can be chosen to exclude the use of the supports with bins having different widths, such as bins manufactured or sold by a different manufacturer or retailer. For example, the vertical supports 106A, 1068 of the embodiment shown in FIGS. 2 and 3 do not extend beyond the perimeter of the base, whereas the vertical supports of the embodiment shown in FIGS. 13-14 may be positioned beyond the perimeter of the base.

Figure 6:
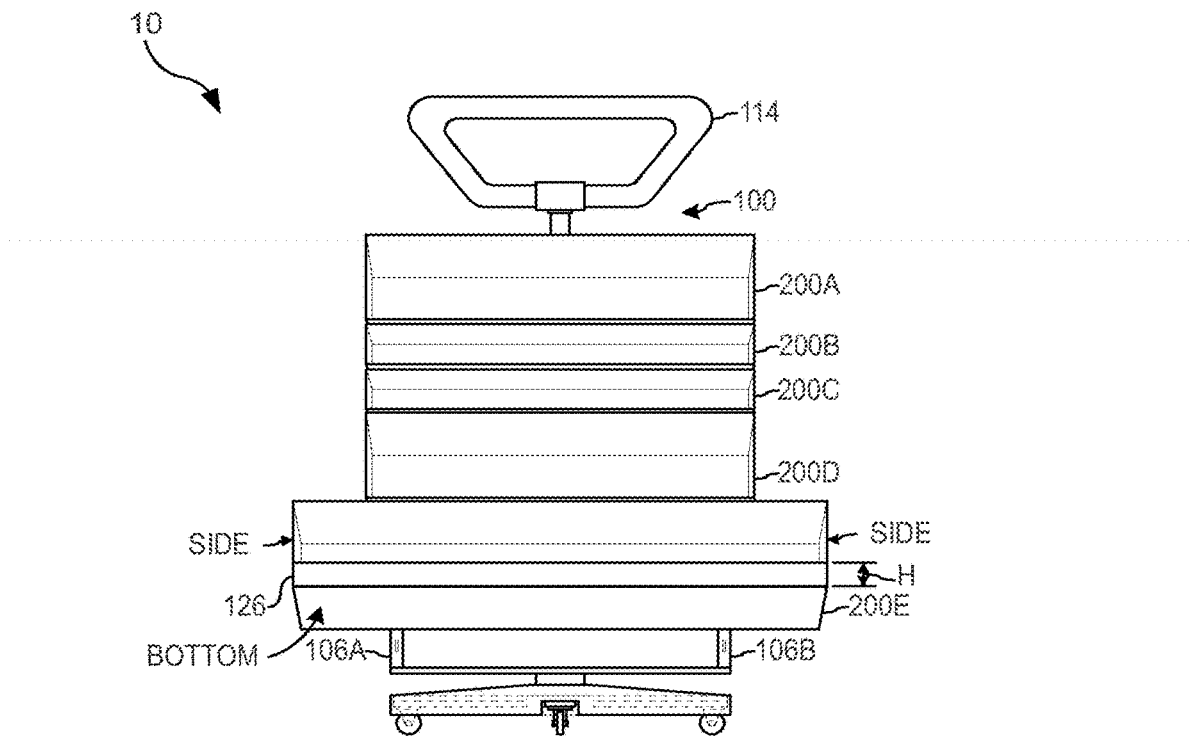
FIG. 6 is a front view of the embodiment of a stand shown in FIG. 1 supporting the embodiment of an array of removable bins.
Figure 7:
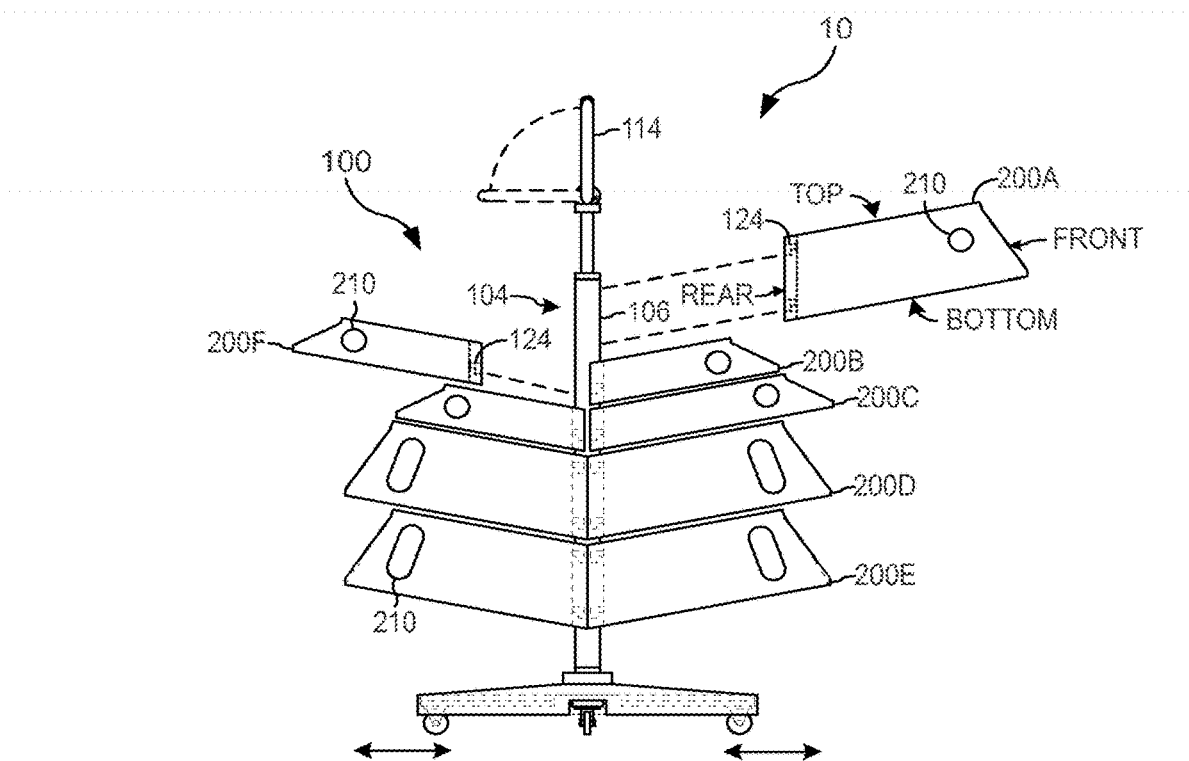
FIG. 7 is a side view of the embodiment of a stand shown in FIG. 1 supporting an embodiment of an array of removable bins.

Turning now to FIGS. 6-7, an embodiment of the array of bins 10 shows the stand 100 supporting a number of removable bins 200. The bins 200 can be made of any suitable material, for example, a sturdy wire mesh supported by a wire frame. The bins 200 are generally rectangular but inclined upward from the rear to the front, open in the front and closed on at least the two sides, the bottom, and the rear portions. The bins 200 may also be enclosed on the top. Note that the terms "top", "bottom", "front", "rear", and "side" pertain to the bins 200 when mounted to the stand 100, as shown in FIGS. 6-7. When not mounted to the stand 100, the bins 200 are preferably configured so they will stand upright with the rear surface 202 (see FIG. 8) resting on a tabletop or other convenient surface. When mounted to the stand 100, the bins attach to the vertical supports 106A, 106B utilizing hooks 124 or hook-like features formed into the rear portion of each bin. The hooks fit into slots 108 formed in the vertical supports 106A, 106B, as can also be seen in FIG. 1. The handle 114 in FIG. 7 is shown in a vertical position, with the horizontal position indicated by dashed lines. As shown in FIG. 7, the bins 200 may be provided with hand holes 210 formed as apertures in the sides of the bins 200. The hand holes 210 may be used to grasp one of the bins 200 when mounting the bin 200 to the stand 100, or when removing the bin 200 from the stand 100.

Turning now to FIG. 6, an embodiment of the array of bins 10 shows different size bins 200 supported by the stand 100. Some of bins, such as bin 200E, may be wider from side-to-side than other bins, such as "standard-sized" bin 200A. Other bins, such as bin 200B, may more narrow from top-to-bottom than other bins, such as bin 200A. As shown in FIG. 7, some bins, such as bin 200B, may be shallower from front-to-rear than other bins, such as bin 200A. Any of the bins 200 may optionally be provided with a lower lip 126 extending from side to side across the front opening of the bin, and rising to a predetermined height H. The predetermined height H may be a standard, fixed height, such as ¾ inch. The predetermined height H may also be a relative proportion of the height of the opening of the bin 200, such as 25 percent of the height of the opening. The lower lip 126 may be provided to help retain the contents of the bin 200.

Turning now to FIG. 7, an embodiment of the array of bins 10 shows bins 200 coupled to the stand 100 on one side of the stand 100 and on an opposite side of the stand 100. The bins 200 may be indented in their rear portions to partially enclose the hook-like features 124, as shown for example in FIG. 8.

Turning now to FIG. 8, a bin 200 may have a rear surface 202 extending from side-to-side across the rear of the bin 200. The rear surface 202 may generally be flat, but preferably includes a first indented portion 204A and a second indented portion 204B. The first and second indented portions 204A and 204B have a width, a depth, and a cross-section profile generally matching a width and cross-section profile of vertical supports 106A, 106B of stand 100, but wherein the depth of the first and second indented portions 204A and 204B is not more than half the depth of the vertical supports 106A, 106B of stand 100. Hooks 124 are provided within first and second indented portions 204A and 204B for mating with slots 108 provided in the vertical supports 106A, 106B of stand 100. When coupled to the stand 100, the bins 200 may fit back-to-back.

Referring back now to FIG. 1, bin 200D is shown supported by stand 100. Bin 200D has a width from side to side, a height from top to bottom, and a depth from front to rear. Below bin 200D, bin 200E is shown supported by stand 100. Bin 200E has a width that is wider than the width of bin 200D, while the height and depth of bin 200E are substantially the same as the height and depth of bin 200D. Above bin 200D, bin 200C is shown supported by stand 100. Bin 200C has a height that is shorter than the height of bin 200D, while the width and depth of bin 200C are substantially the same as the width and depth of bin 200D. The bins 200 may be provided in different sizes, as shown in FIG. 1, for example, to accommodate different sized materials, as long as the mounting provisions at the rear of the bins 200 mate with corresponding provisions of the stand 100.

With reference now to FIG. 1, it can be seen that bin 200A mounts to the stand 100 using hook connectors 124 to secure the bin 200A to the vertical supports 106A, 106B. It can further be seen that hooks 124 of the bins 200 couple to the vertical supports 106A, 106B at slots 108 provided in the vertical supports 106A, 106B of stand 100. It can also be seen from bin 200C, for example, that the indented portions 204A, 204B fit around and partially enclose the vertical supports 106A, 106B. Provision of hook fasteners 124 within the indented portions 204A, 204B at the rear of each bin 200 permit the bins 200 to preferably fit together "back-to-back" with their respective rear surfaces 202 adjacent each other.

Turning now to FIG. 9, the array of bins 10 is shown in a top view, in which the stand 100 supports bin 200A on one side of the stand 100, and supports bin 200F on an opposite side of the stand 100. Base 102, represented by dashed lines, is obscured from view by the bins 200A, 200F. Handle 114 is shown above the bins 200A, 200F, in an intermediate position between a vertical position and horizontal position. Bin 200A is shown mounted to stand 100 such that its indented portion 204A is coupled to vertical support 106B, and the indented portion 204B of bin 200A is coupled to vertical support 106A. Bin 200F is shown mounted to stand 100 such that its indented portion 204A is coupled to vertical support 106A, and the indented portion 204B of bin 200F is coupled to vertical support 106B. The indented portions 204 of each of bins 200A and 200F each partially enclose or surround the respective vertical supports 106A, 106B to which the bins are mounted. Consequently, the rear surface 202A of bin 200A is positioned adjacent the rear surface 202F of bin 200F in "back-to-back" fashion.

With reference now to FIG. 8, the rear surface 202 need not be indented as shown, but may instead be flat with hook connectors 124 extending rearward from the flat surface 202. However, incorporating indented portions 204, in which hook fasteners 204 are mounted, advantageously provides a substantially flat rear surface 202 thereby allowing the rear surface of each bin to rest on a tabletop, for example, without the hook connectors 124 being damaged or marring the surface of the tabletop. It will also be apparent that hooks could alternatively be secured to the vertical supports 106A, 106B by suitable means, and mating slots positioned on the rear surface of the bins 200, to secure the bins to the vertical supports 106A, 106B.

Turning now to FIG. 10, the handle 114 of stand 100 is shown pivoted to a folded, horizontal position, so that any of the bins 200 and contents of the bins 200, such as papers or crafting materials, may be placed temporarily on the handle 114. The handle 114 is preferably flattened on each side to provide an even surface for temporary support.

As described above, an embodiment of the array of bins 10 may provide the following features. The stand 100 may provide openings or slots 108 arranged vertically so the location of the bins 200 may be adjusted to a desired height. The attachable bins 200, or mounting brackets 300 described hereinafter, may be angled upwardly to accessibly hold contents therein. The attachable bins 200 may be open-ended and outward facing for easy access to the contents therein. The attachable bins 200 may be provided in a variety of dimensions depending upon such things as whether any papers to be contained therein are letter sized or legal sized, the thickness of a stack of papers from the top to the bottom of the stack, or the size of scrap booking supplies or other materials to be contained therein. The handle 114 may be used to provide portability so that a home user can quickly move the array of bins 10 into a closet and obtain the look of a tidy study, or an office user can quickly move the array of bins 10 to a less-conspicuous area or storage space to obtain a tidier looking office, or a user can easily work in another room of the house, if a home user, or another office area, if an office user.

Extendable and retractable slide mechanisms 120 supporting wheels 118 have been shown in extended positions. In an embodiment, a spring-loaded mechanism can be provided within the base for causing the wheels or casters to extend when desired. For example, the spring-loaded mechanism can be configured to release and extend the casters in response to a user pressing down on the stand. In an embodiment, the spring-loaded mechanism can be provided with a further mechanism for retracting the casters and retaining the extendable casters within the perimeter of the base. For example, a lever can be provided to retract the casters, compress the spring, and latch the spring-loaded mechanism for later release. In another embodiment, a spring-loaded mechanism may be configured to extend retractable wheels or casters downwardly in response to a user pressing down on the base 102 at one or more locations on the base. In an embodiment, spring-release actuators, or buttons, may be provided to release the springs and permit the wheels or casters to extend. An exemplary spring-loaded mechanism is described below with reference to FIGS. 11A-12B.

Turning now to FIG. 11A, the base 102 is shown from below, wherein retractable slide mechanisms 120 support wheels 118. Slide mechanisms 120 may comprise a fixed portion 121 and a sliding portion 123 (FIG. 12A), slideably coupled together using a dovetail and slot configuration similar to that found in a typical drawer slide. Slide mechanisms 120 may further comprise mounting flanges 127 formed in the fixed portion 121, and may be secured to the underside of base 120 using screws or other mechanical fasteners 129, each passing through an aperture provided in the mounting flange 127 and securing to the underside of base 102. Each retractable slide mechanism 120 may be coupled to a compressible spring 130 or other resilient member disposed between an inboard end of the retractable slide mechanism 120 and a central hub 132. The action of the compressed spring 130 urges the retractable slide mechanism 120 outwards away from the central hub 132. Each retractable slide mechanism 120 may further be coupled to at least one latch 134, each latch 134 having a first end 136 and a second end 138. The first end 136 of latch 134 may couple to the retractable slide mechanism 120 to restrain the mechanism from sliding. The latch 134 may be pivotably mounted to the underside of the base 102 and secured to base 102 using suitable mechanical fasteners. An actuator 140 may be provided to release one or more of the latches 134 and may, for example, be coupled to a linkage 142 and be configured to move towards the central hub 132 upon actuation, thereby coming into contact with and pressing upon the second end 138 of the latches 134. Upon actuation, the latches 134 pivot about their central mounting provisions, and release the retractable slide mechanisms 120 by disengaging the first end 136 of each latch 134 from the retractable slide mechanisms 120. The action of springs 130 cause the retractable slide mechanisms 120 to extend wheels 118 beyond the perimeter of base 102 upon actuation of the actuator 140.

Turning now to FIG. 11B, actuator 140 is shown moved towards central hub 132, pressing upon the second ends 138 of latches 134 such that first ends 136 of latches 134 disengaged retractable slide mechanisms 120. With the latches 134 pivoted to their released positions, springs 130 urge the retractable slide mechanisms 120 outwards away from the central hub 132 and thereby extend wheels 118 beyond the perimeter of base 102.

Turning now to FIG. 12A, the base 102 is shown in cross section, illustrating a spring-loaded mechanism within the base 102. Swivel 116 can be provided with a depressible member 144 disposed through the middle of swivel 116 and mechanically coupled to the second horizontal support 112. The depressible member 144 is configured to be pressed down into the base 102 by pressure applied to the handle 114 (FIG. 10) or otherwise applied evenly to the frame 104 (FIG. 10). A linkage 142 may comprise at least one wire coupled at a first end thereof to the depressible member 144, wherein the wire may be routed over one or more pulleys or bearing surfaces, and coupled at a second end thereof to the actuator 140 as shown in FIGS. 11A, 11B. As shown in FIG. 12B, pressing down on the depressible member 144 applies tension to the wires, causing the actuators 140 to be drawn towards the central hub 132, thereby coming into contact with and pressing upon the second end 138 of the latches 134 and releasing the retractable slide mechanisms 120 as described above.

Figures 20A, 20B:
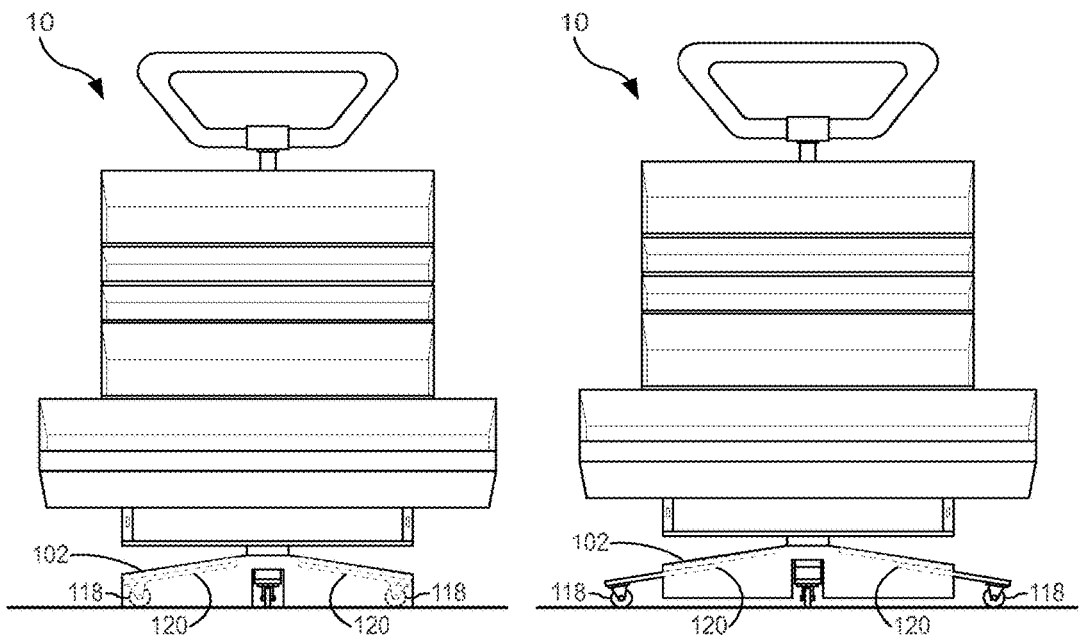
FIGS. 20A and 20B are front views of an embodiment of the stand showing an alternate arrangement of extendable wheels.

Alternatively, as shown in FIGS. 20A-20B, the slide mechanisms 120 can be mounted at an angle, inclined upward towards the center of base 102 and inclined downward toward the perimeter of base 102 so that, with modifications to the base 102, the base 102 can sit directly upon an underlying surface when the slide mechanisms are retracted. When latches 134 are pivoted to their released positions in this alternate arrangement, springs 130 can urge the slide mechanisms 120 outwards and downwards to extend wheels 118 into contact with the underlying surface and raise the base 102 up from the underlying surface.

Turning now to FIGS. 13-14, an alternative embodiment stand 100' comprises a base 102' and a frame 104', in which the frame 104' comprises vertical support members 106C and 106D, each vertical support member 106C and 106D having slots 108 configured as side-by-side pairs of slots arranged one above the other. The horizontal spacing of side-by-side pairs of slots 108 preferably conforms to spacing of corresponding double-hook mounting features, which may be provided on certain alternative variants of the bins 200, or which may be provided on other mounting brackets for supporting various containers upon stand 100'.

Turning now to FIG. 15, a mounting bracket 300 comprises a vertical portion 302 supporting two pairs of hook connectors 304, a horizontal portion 306, and an angled portion 308. The hook connectors 304 are preferably configured as two side-by-side pairs of hooks arranged one above the other, in which the horizontal and vertical spacing of the hooks 304 conform to the spacing of the slots 108 formed in vertical support members 106C and 106D (FIGS. 13-14). Extending from vertical portion 302, the horizontal portion 306 supports a corner 310 of angled portion 308. Mounting brackets 300 may be made with angled portion 308 set at different, fixed angles, and/or adjustable angles, and are interchangeable with mounting brackets 300 made at different angles. The angled portion 308 is preferably configured to support one end of a container, such as a typical cardboard bankers' box or other similar container, on a supporting surface 312. Mounting brackets 300 are preferably provided as pairs of mirror-image brackets 300A, 300B. Each bracket of the pair, bracket 300A and bracket 300B, may have a flange 314 rising up from one edge of a supporting surface 312. As shown in FIG. 15, mounting bracket 300A may be a "left-handed" bracket and mounting bracket 300B may be a "right-handed" bracket. The pair of mirror-image mounting brackets 300A and 300B may be mounted to the stand 100' with left-handed bracket 300B mounted to vertical support member 106C and right-handed bracket 300A mounted to vertical support member 106D, as shown in FIG. 16.

Turning now to FIG. 17, mounting brackets 300 may be mounted to the frame 104' of stand 100' to support additional containers such as a typical cardboard or plastic box 350, or a typical cardboard or plastic banker's box 360. The box 350, or banker's box 360, preferably rests in a pair of brackets 300A, 300B such that corner edges of what would normally be the bottom and the rear of the box 350, or 360, lie in the angled portion of bracket 300. In such an orientation, the contents of the box 350, or 360, are readily accessible through an opening in the front and top of the box 350, or 360.

Figure 19:
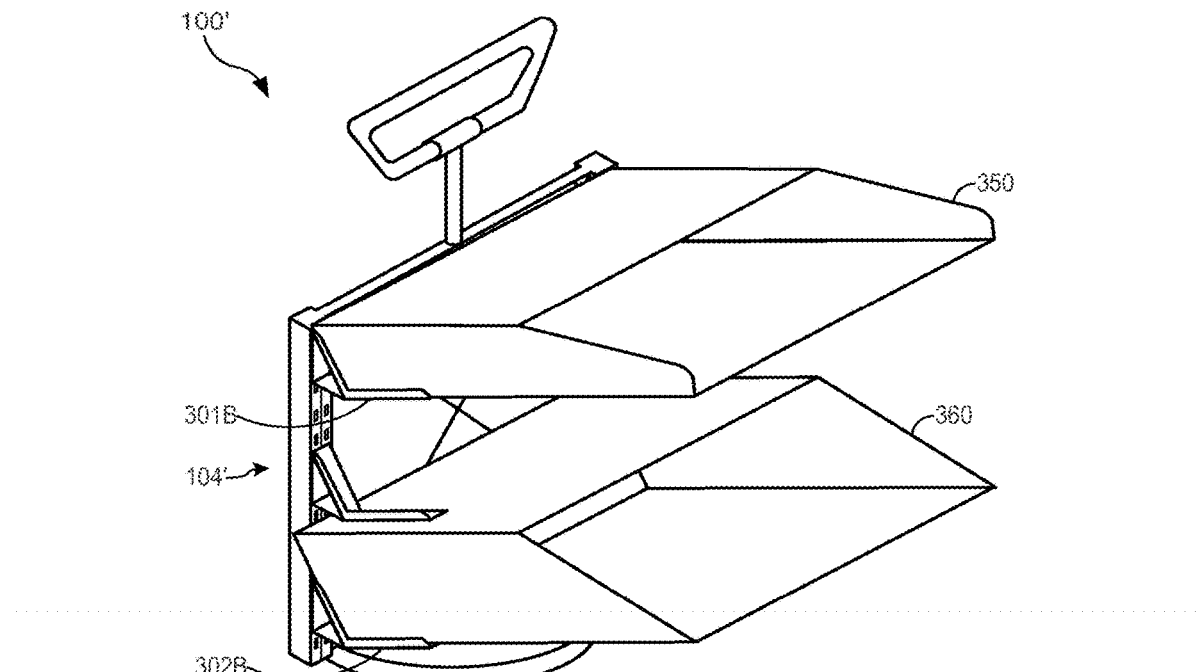
FIG. 19 is a perspective view of the stand shown in FIG. 18 supporting boxes of different sizes.

Turning now to FIG. 18, right-handed mounting brackets 300A can be mounted to frame 104' at vertical support 106D, along the right-hand side of the frame 104' and left-handed mounting brackets 300B can be mounted to frame 104' at vertical support 106C, along the left-hand side of the frame 104'. Mounting brackets 300 can be mounted anywhere along the frame 104' as desired to provide adequate clearance for boxes 350, 360, and bins 200. Mounting brackets 300 are shown mounted on one side of frame 104', and may also be mounted on an opposite side of the frame 104', as shown in FIG. 17. Turning now to FIG. 19, a banker's box 350 rests in a first pair of mounting brackets 301 installed upon frame 104' of the stand 100'. A banker's box 360 rests in a second pair of mounting brackets 302 installed upon frame 104' of the stand 100'. Note that mounting brackets 301A, 302A are hidden behind boxes 350 and 360 in the view of FIG. 19.

Figure 21:
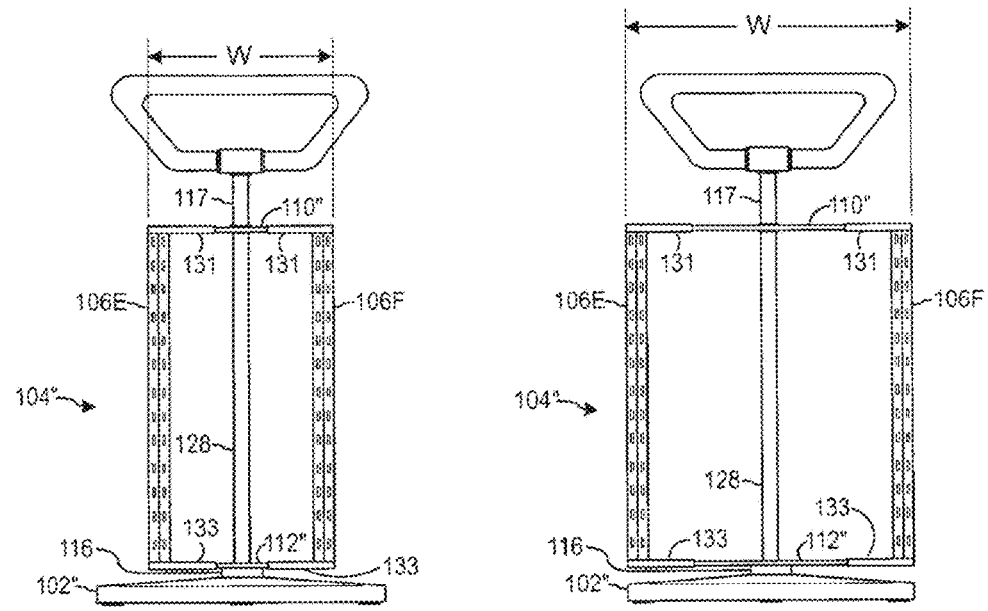
FIG. 21 is a front view of an adjustable embodiment of the stand.

Turning now to FIG. 21, an alternative embodiment stand 100" comprises a base 102" and a frame 104", in which the frame 104" comprises vertical support members 106E and 106F, and horizontal support members 110" and 112". Each vertical support member 106E and 106F may have slots 108 configured as side-by-side pairs of slots arranged one above the other. Alternatively, the vertical supports 106E and 106F may have slots 108 configured as a single column of individual slots 108 arranged one above the other. More particularly, however, the vertical supports 106E and 106F are configured to slide along the horizontal support members 110" and 112" so that the width W of the stand 100" can be adjusted. In an embodiment, a central support rod 128 may be coupled to the base 102" at the center of the base 102", and may optionally be pivotably coupled to the base 102" at swivel 116. The lower horizontal support member 112" may be coupled to the stand 102" and secured by installation of the central support rod 128, which may be coupled to the base 102" by any suitable coupling means, such as by use of threaded couplings. The upper horizontal support member 110" may be coupled to the central support rod 128 at a top end thereof, and secured to the central support rod by installation of the vertical extension 117, which may be coupled to the top end of central support rod 128 by any suitable coupling means, such as by use of threaded couplings. Horizontal support members 110" and 112" may be rigid bars having either a rectangular cross-section, a circular cross-section, or some other suitably shaped cross-section.

The vertical supports 106E and 106F may each have an upper horizontal channel member 131 and a lower horizontal channel member 133 affixed to the top and bottom ends, respectively, of each vertical support 106E and 106F. Horizontal channel members 131 and 133 may be rigid, hollow channels having either a rectangular cross-section, a circular cross-section, or some other suitably shaped cross-section, and may be permanently affixed to the vertical support members 106E and 106F by welding, brazing, or other suitable means. Preferably, the cross-sectional configuration of the horizontal channel members 131 and 133 match the cross-sectional configuration of horizontal support members 110" and 112", such that the horizontal channel members 131 and 133 may slide over the ends of horizontal support members 110" and 112". In operation, the vertical supports 106E and 106F may slide from side-to-side to adjust the width of the frame 104" for receiving bins or boxes of differing widths.

Figure 22:
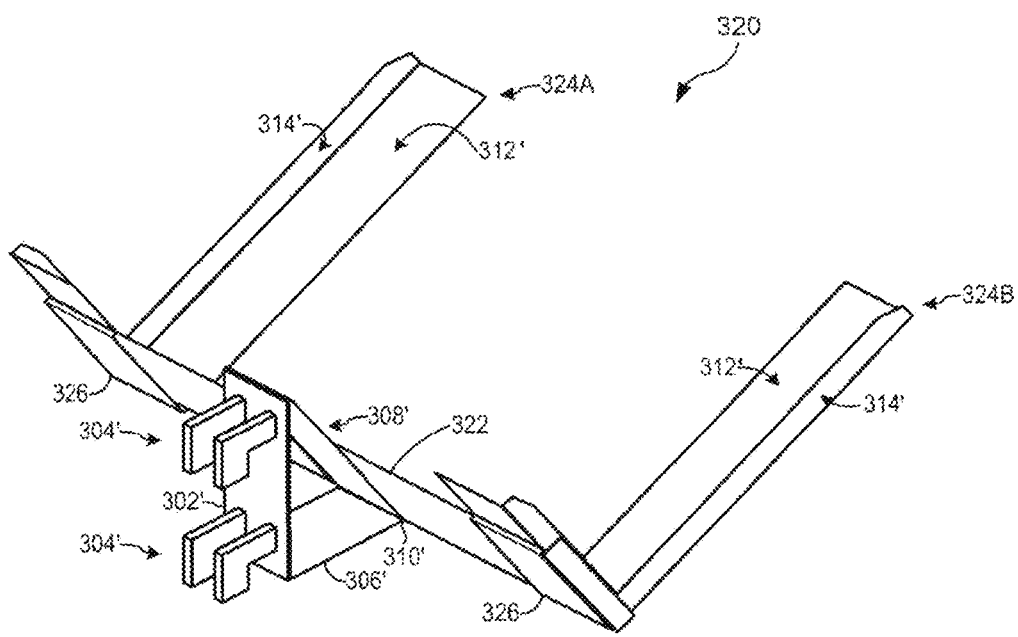
FIG. 22 is a perspective view of an adjustable mounting bracket according to an aspect of the invention.

Turning now to FIG. 22, an adjustable mounting bracket 320 may have a vertical portion 302' supporting two pairs of hooks 304', a horizontal portion 306', and an angled portion 308'. The hooks 304' are preferably configured as two side-by-side pairs of hooks arranged one above the other, in which the horizontal and vertical spacing of the hooks 304' conform to the spacing of the slots 108 formed in vertical support members 106C and 106D (FIGS. 13-14). Extending from vertical portion 302', the horizontal portion 306' supports a corner 310' of angled portion 308'. A horizontal bracket support member 322 may be affixed to angled portion 308' for supporting one or more box support brackets 324A and 324B. Each box support bracket 324A and 324B may have a flange 314' rising up from one edge of a supporting surface 312'. As shown in FIG. 22, box support bracket 324A may be a "left-handed" support bracket, and box support bracket 324B may be a "right-handed" support bracket. Each box support bracket 324A and 324B may be supported on bracket support member 322 via a channel formed in a rear portion 326 of supporting surface 312'. The adjustable mounting bracket 320 may be mounted to stand 100', or stand 100", and the box support brackets 324A and 324B adjusted along horizontal bracket support member 322 for receiving a banker's box or a magazine box or other box having a particular width.

Figures 23, 24:
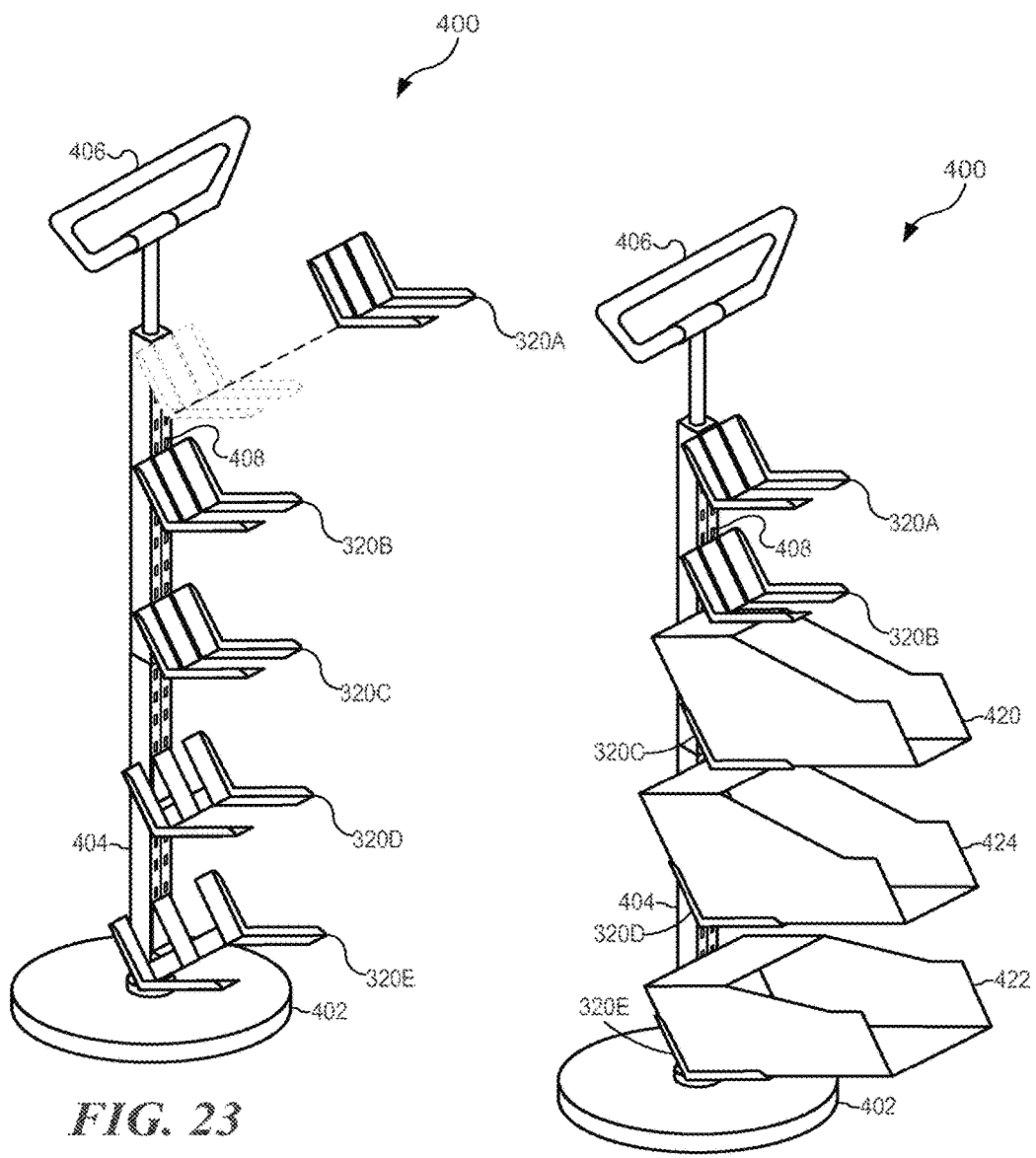
FIG. 23 is a perspective view of an embodiment of a stand according to another aspect of the invention.
FIG. 24 is a perspective view of the stand of FIG. 23, with storage boxes.

Turning now to FIG. 23, and according to another aspect of the invention, a stand 400 may have a base 402 and a vertical support 404, the vertical support 404 being an elongated member having a number of rectangular apertures or slots 408 formed therein for supporting one or more removable mounting brackets 320. The slots 408 may be a single or double column of apertures formed in surfaces of vertical support 404, and may be spaced apart vertically at regular intervals. A handle 406 may be provided at the top of the vertical support 404. A first mounting bracket 320A may be mounted near the top of vertical support 404. A second mounting bracket 320B may be mounted below the first mounting bracket 320A on the vertical support 404. Third, fourth, and fifth mounting brackets 320C, 320D and 320E, respectively, may be mounted below the second mounting bracket 320B on the vertical support 404. Mounting brackets 320A-320E may be adjustable in certain embodiments, in which first mounting bracket 320A may be adjusted to its minimum width, fifth mounting bracket 320E may be adjusted to its full width, and fourth mounting bracket 320D may be adjusted to an intermediate width. The stand 400 supports one or more removable mounting brackets, some of which may be adjustable in width, for supporting one or more storage boxes configured as magazine boxes, banker's boxes, or some other similar type of storage box.

Turning now to FIG. 24, stand 400 is shown supporting, for example, a magazine box 420 supported by mounting bracket 320C, a banker's box 422 supported by mounting bracket 320E, and another storage box 424 supported by mounting bracket 320D. It will be appreciated that mounting brackets 320 may be arranged upon stand 400 in any desired configuration, and that adjustable mounting brackets 320 may be adjusted as desired for holding storage boxes of different sizes.

Figure 25:
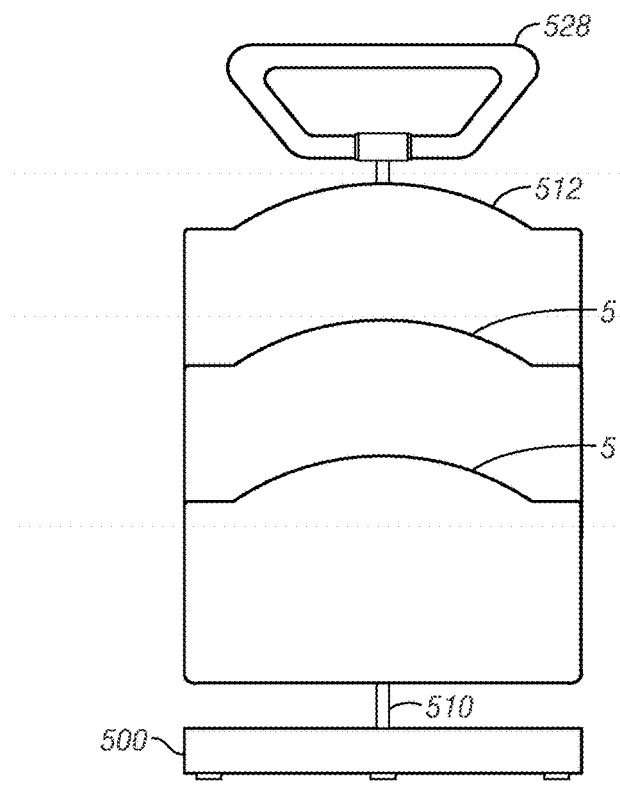
FIG. 25 is a front view of one embodiment with non-removable receivers.
Figure 26:
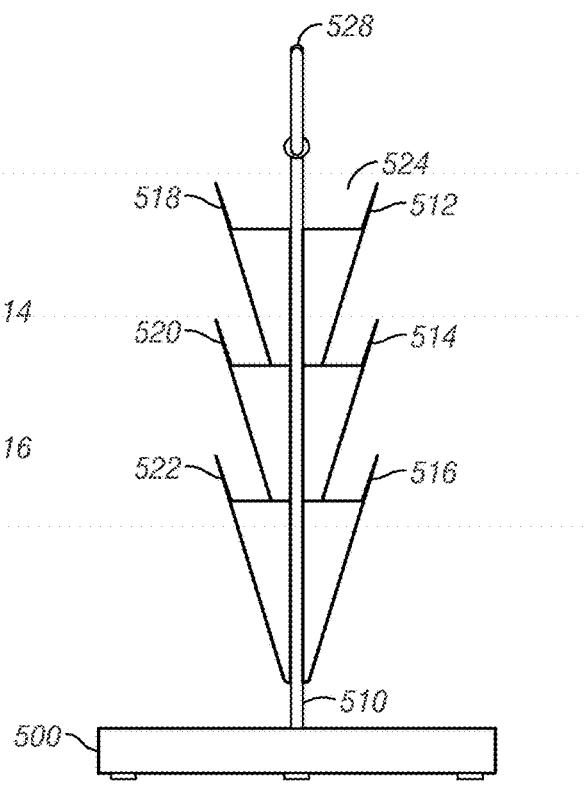
FIG. 26 is a side view of the embodiment of FIG. 25.
Figure 27:
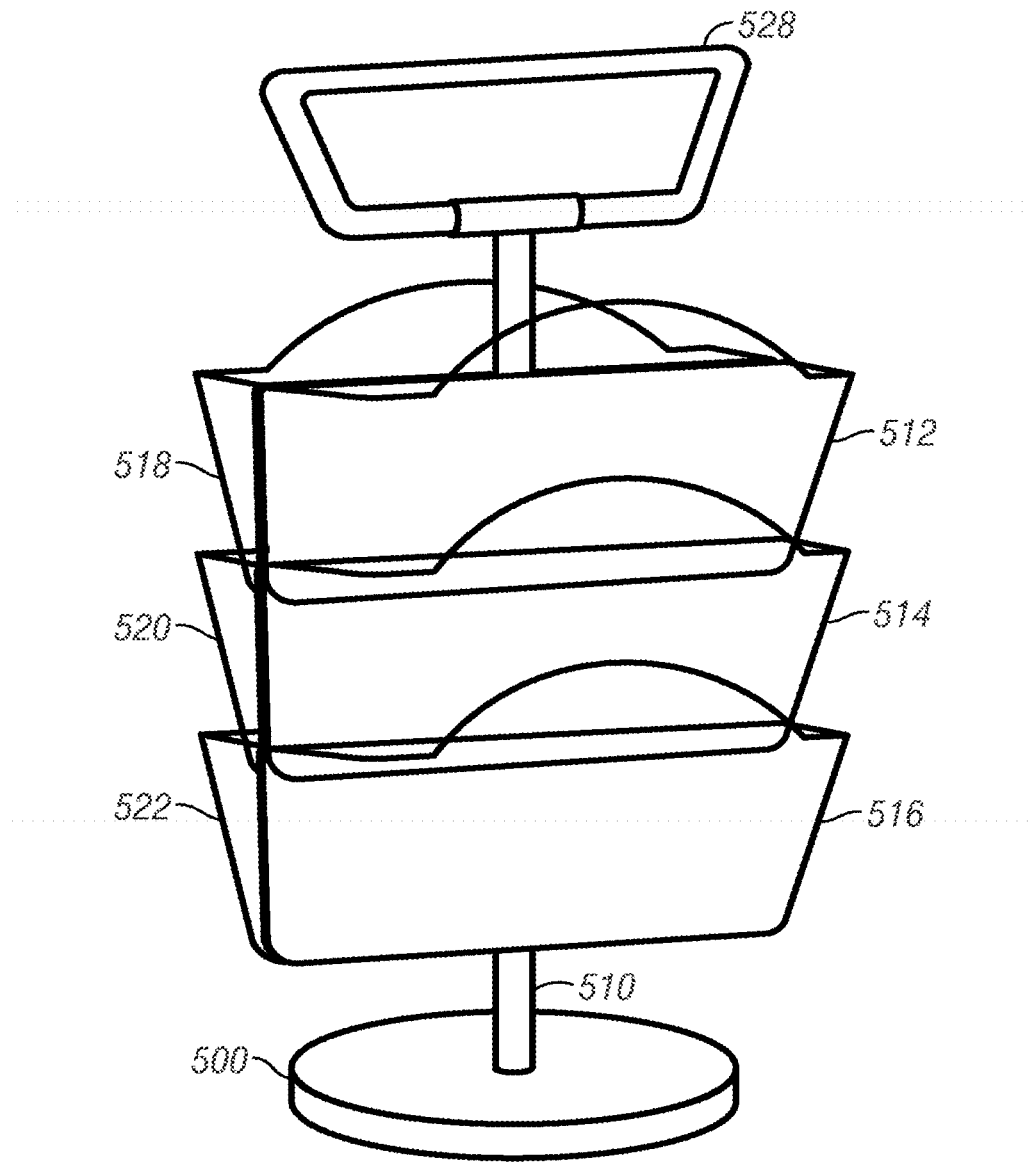
FIG. 27 is a perspective view of the embodiment of FIG. 25.

Finally turning to FIGS. 25, 26 and 27, they show a base support 500, a receiver support 510, fixed location receivers 512, 514, 516, 518, 520 and 522 attached to receiver support 510, with each receiver projecting upwardly and outwardly terminating to define an opening 524 for storage of files or the like. At the top of receiver support 510 is handle 528.

Having thus described the present invention by reference to certain of its embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word means are not intended to fall under 35 USC 112, paragraph 6.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

What is claimed is:

1. A portable organizer system, comprising:
    a base member;
    a central vertical member having a longitudinal axis, the central vertical member coupled to the base member at a lower end of the central vertical member;
    a plurality of receivers attached to the central vertical member, wherein each receiver in the plurality of receivers comprises:
    a back planar element adapted to couple to the central vertical member and having a lower edge which is transverse to a direction of the longitudinal axis of the central vertical member,
    an angled planar element having an upper edge and a lower edge which are generally transverse to the direction of the longitudinal axis of the central vertical member, wherein the lower edge of the back planer element is coupled to the lower edge of the angled planer element;
    a first side planer element coupling a first side edge of the angled planar element to a first side edge of the back planar element;
    a second side planer element coupling a second side edge of the angled planar element to a second side edge of the back planar element;
    wherein a first receiver in the plurality of receivers is positioned such that the first receiver laterally opposes a second receiver with respect to the longitudinal axis, and both the first receiver and second receiver are positioned at a first substantially equal longitudinal distance along the longitudinal axis;

wherein a third receiver in the plurality of receivers is positioned such that the third receiver laterally opposes a fourth receiver with respect to the longitudinal axis, and both the third receiver and fourth receiver are positioned at a second substantially equal longitudinal distance along the longitudinal axis and above the first and second receivers with respect to the longitudinal axis and the base member;

wherein the third and fourth receivers are longitudinally positioned such that the lower edge of each angled planar element of the third and fourth receivers are longitudinally lower than the upper edge of each angled planar element of the first and second receivers, respectively; and a handle rotatably coupled to a top portion of the central vertical member such that the handle rotates from a first position wherein a longitudinal axis of the handle is generally parallel to the longitudinal axis of the central vertical member to a second position where the longitudinal axis of the handle is generally perpendicular to the longitudinal axis of the central vertical member and wherein the handle cannot rotate past the second position.

2. The portable organizer system of claim 1, wherein the upper edge of the angled planar element includes a curved edge portion.

3. The portable organizer system of claim 1, wherein a curved coupling member joins the lower edge of the back planar element to the lower edge of the angled planar element.

4. The portable organizer system of claim 1, wherein each of the plurality of receivers is removably attached to the vertical support member.

5. The portable organizer system of claim 1, wherein a width of each of the first and second receivers is substantially equal to or greater than a width of the central vertical member.

6. The portable organizer system of claim 1, further comprising a plurality of friction reducing members attached to a lower surface of the base member.

7. The portable organizer system of claim 6, wherein the plurality of friction reducing members comprises a plurality of retractable wheel members.

8. A portable organizer system, comprising:
a base member;
a central vertical member having a longitudinal axis, the central vertical member coupled to the base member at a lower end of the central vertical member;
a plurality of receivers attached to the central vertical member, wherein each receiver in the plurality of receivers comprises:
a back planar element adapted to couple to the central vertical member and having a first edge which is transverse to a direction of the longitudinal axis of the central vertical member,
an angled planar element having an upper edge and a lower edge which are transverse to the direction of the longitudinal axis of the central vertical member,
wherein first edge of the back planar element is coupled to the lower edge of the angled planar element and wherein a plane of the angled planar element intersects the plane of the back planar element at an acute angle of less than 45 degrees;

wherein a second receiver in the plurality of receivers is longitudinally positioned such that a first receiver laterally opposes the second receiver with respect to the longitudinal axis, and both the first receiver and second receiver are positioned at a first substantially equal longitudinal distance along the longitudinal axis;

wherein a third receiver in the plurality of receivers is positioned such that the third receiver laterally opposes a fourth receiver with respect to the longitudinal axis, and both the third receiver and fourth receiver are positioned at a second substantially equal longitudinal distance along the longitudinal axis; and a handle rotatably coupled to a top portion of the central vertical member such that the handle rotates from a first position wherein a longitudinal axis of the handle is generally parallel to the longitudinal axis of the central vertical member to a second position where the longitudinal axis of the handle is generally perpendicular to the longitudinal axis of the central vertical member and wherein the handle cannot rotate past the second position.

9. The portable organizer system of claim 8, wherein the upper edge of the angled planar element includes a curved edge portion.

10. The portable organizer system of claim 8, wherein each of the plurality of receivers is removably attached to the central vertical member.

11. The portable organizer system of claim 8, wherein a width of each of the first and second receivers is substantially equal to or greater than a width of the central vertical member.

12. The portable organizer system of claim 8, further comprising a plurality of friction reducing members attached to a lower surface of the base member.

13. The portable organizer system of claim 12, wherein the plurality of friction reducing members comprises a plurality of retractable wheel members.

14. The portable organizer system of claim 8, wherein each receiver in the plurality of receivers comprises:
a first side planer element coupling a first side edge of the angled planar element to a first side edge of the back planar element; and
a second side planer element coupling a second side edge of the angled planar element to a second side edge of the back planar element.

15. A portable organizer system, comprising:
a base member;
a central vertical member having a longitudinal axis, the central vertical member coupled to the base member at a lower end of the central vertical member;
a plurality of receivers attached to the central vertical member, wherein each receiver in the plurality of receivers comprises:
a back planar element adapted to couple to the central vertical member and having a first lower edge which is transverse to the longitudinal axis of the central vertical member,
an angled planar element having an upper edge and a lower edge which are transverse to the longitudinal axis of the central vertical member, wherein the first lower edge of the back planar element is coupled to the lower edge of the angled planer element and wherein a plane of the angled planar element intersects a plane of the back planar element at an acute angle of less than 45 degrees;

wherein a second receiver in the plurality of receivers is positioned above a first receiver with respect to the longitudinal axis and the support base;

wherein the first and second receivers are longitudinally positioned such that the lower edge of the angled planar element of the second receiver is positioned longitudinally lower than the upper edge of the angled planar element of the first receiver, respectively; and a handle rotatably coupled to a top portion of the central vertical member such that the handle rotates from a first position wherein a longitudinal axis of the handle is generally parallel to the longitudinal axis of the central vertical member to a second position where the longitudinal axis of the handle is generally perpendicular to the longitudinal axis of the central vertical member and wherein the handle cannot rotate past the second position.

16. The portable organizer system of claim 15, wherein each of the plurality of receivers is removably attached to the central vertical member.

17. The portable organizer system of claim 15, wherein the upper edge of the angled planar element includes a curved edge portion.

18. The portable organizer system of claim 15, further comprising a plurality of friction reducing members attached to a lower surface of the base member.

19. The portable organizer system of claim 18, wherein the plurality of friction reducing members comprises a plurality of retractable wheel members.

20. The portable organizer system of claim 18, wherein each receiver in the plurality of receivers comprises:
a first side planer element coupling a first side edge of the angled planar element to a first side edge of the back planar element; and
a second side planer element coupling a second side edge of the angled planar element to a second side edge of the back planar element.

* * * * *